US012167387B2

(12) United States Patent
Akkarakaran et al.

(10) Patent No.: US 12,167,387 B2
(45) Date of Patent: Dec. 10, 2024

(54) SIDELINK CARRIER GROUPING FOR WIRELESS COMMUNICATION

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Junyi Li, Fairless Hills, PA (US); Jing Sun, San Diego, CA (US); Xiaoxia Zhang, San Diego, CA (US); Juan Montojo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 17/391,919

(22) Filed: Aug. 2, 2021

(65) Prior Publication Data

US 2022/0053519 A1      Feb. 17, 2022

Related U.S. Application Data

(60) Provisional application No. 63/065,664, filed on Aug. 14, 2020.

(51) Int. Cl.
*H04W 72/1263* (2023.01)
*H04W 56/00* (2009.01)
(Continued)

(52) U.S. Cl.
CPC ..... *H04W 72/1263* (2013.01); *H04W 56/001* (2013.01); *H04W 72/0453* (2013.01); *H04W 72/20* (2023.01); *H04W 92/18* (2013.01)

(58) Field of Classification Search
CPC .......... H04W 72/1263; H04W 56/001; H04W 72/0453; H04W 72/20; H04W 92/18; H04L 5/0094; H04L 5/001
See application file for complete search history.

(56) References Cited

U.S. PATENT DOCUMENTS

2014/0050194 A1*  2/2014  Gaal ................. H04W 72/0453
                                                              370/330
2018/0234888 A1    8/2018  Yasukawa et al.
(Continued)

FOREIGN PATENT DOCUMENTS

WO      2019157995 A1     8/2019

OTHER PUBLICATIONS

Huawei., et al., "Bandwidth Parts and Resource Pools for V2X Sidelink", 3GPP TSG RAN WG1 Meeting #95, Spokane, USA, Nov. 12-16, 2018, R1-1813555, (Year: 2018), 12 pages, XP051555610, Retrieved from the Internet: URL: http://www.3gpp.org/ftp/Meetings%5F3GPP%5FSYNC/RAN1/Docs/R1%2D1813555%2Ezip. [Retrieved on Nov. 11, 2018], p. 6. Paragraph 2.2-p. 8. Paragraph 2.4 Section 4, p. 9-p. 11 Figures 2-6.
(Continued)

*Primary Examiner* — Mohammad S Adhami
*Assistant Examiner* — Jesse P. Samluk
(74) *Attorney, Agent, or Firm* — Loza & Loza, LLP

(57) ABSTRACT

Aspects relate to grouping sidelink carriers in a wireless communication network. A first wireless communication device, such as a user equipment (UE), may communicate with a base station on a cellular link utilizing a first set of first component carriers (CCs) in a particular frequency band. The UE may identify one or more first carrier groupings for the first set of first CCs with the base station. The UE may communicate with a second wireless communication device, such as a second UE, on a sidelink utilizing a
(Continued)

second set of CCs within the same frequency band. The first UE may map at least one second CC to a respective corresponding first CC and apply the one more carrier groupings to the second set of CCs to generate one or more second carrier groupings based on the mapping.

30 Claims, 13 Drawing Sheets

(51) Int. Cl.
*H04W 72/0453* (2023.01)
*H04W 72/20* (2023.01)
*H04W 92/18* (2009.01)

(56) References Cited

U.S. PATENT DOCUMENTS

| 2020/0070879 | A1* | 3/2020 | Kim | B62D 6/002 |
| 2020/0351975 | A1* | 11/2020 | Tseng | H04L 5/0057 |
| 2022/0070879 | A1* | 3/2022 | Ryu | H04W 72/20 |
| 2022/0210739 | A1* | 6/2022 | Yi | H04W 52/0229 |
| 2022/0377662 | A1* | 11/2022 | Sun | H04L 5/001 |

OTHER PUBLICATIONS

International Search Report and Written Opinion—PCT/US2021/044326—ISA/EPO—Nov. 15, 2021.

* cited by examiner

SIDELINK CARRIER GROUPING FOR WIRELESS COMMUNICATION

CROSS-REFERENCE TO RELATED APPLICATIONS

The present Application for Patent claims priority to and the benefit of U.S. Provisional Application No. 63/065,664, filed Aug. 14, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to grouping carrier component signals in sidelink signals.

INTRODUCTION

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

One example of a wireless communication system that may employ sidelink signaling is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is provided in a wireless communication network. The wireless communication device includes a transceiver, a memory, and a processor communicatively coupled to the transceiver and the memory. The processor and the memory may be configured to communicate with a base station on a cellular link utilizing a first set of first component carriers in a first frequency band. The processor and the memory may be further configured to identify at least one first carrier grouping for the first set of first component carriers with the base station, and communicate with a second wireless communication device on a sidelink utilizing a second set of second component carriers within the first frequency band. The processor and the memory may be further configured to map at least one second component carrier to a respective corresponding first component carrier and apply the at least one first carrier grouping to the second set of second component carriers to generate at least one second carrier grouping based on the mapping.

Another example provides for a method for wireless communication at a first wireless communication device. The method includes communicating with a base station on a cellular link utilizing a first set of first component carriers in a first frequency band. The method further includes identifying at least one first carrier grouping for the first set of first component carriers with the base station and communicating with a second wireless communication device on a sidelink utilizing a second set of second component carriers within the first frequency band. The method further includes mapping at least one second component carrier to a respective corresponding first component carrier and applying the at least one first carrier grouping to the second set of second component carriers to generate at least one second carrier grouping based on the mapping.

Another example provides a wireless communication device in a wireless communication network. The wireless communication device includes a transceiver, a memory, and a processor communicatively coupled to the transceiver and the memory. The processor and the memory may be configured to identify at least one carrier grouping for a set of component carriers in a first frequency band for a sidelink and communicate with a second wireless communication device on the sidelink utilizing the set of component carriers within the first frequency band. The processor and the memory may be further configured to transmit sidelink control information (SCI) on the sidelink identifying the at least one carrier grouping to the second wireless communication device.

Another example provides a wireless communication device in a wireless communication network. The wireless communication device includes a transceiver, a memory, and a processor communicatively coupled to the transceiver and the memory. The processor and the memory may be configured to receive at least one carrier grouping for a set of component carriers in a first frequency band for sidelink data communication from a second wireless communication device. The processor and the memory may be further configured to communicate with a third wireless communication device on a sidelink utilizing the set of component carriers within the first frequency band.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
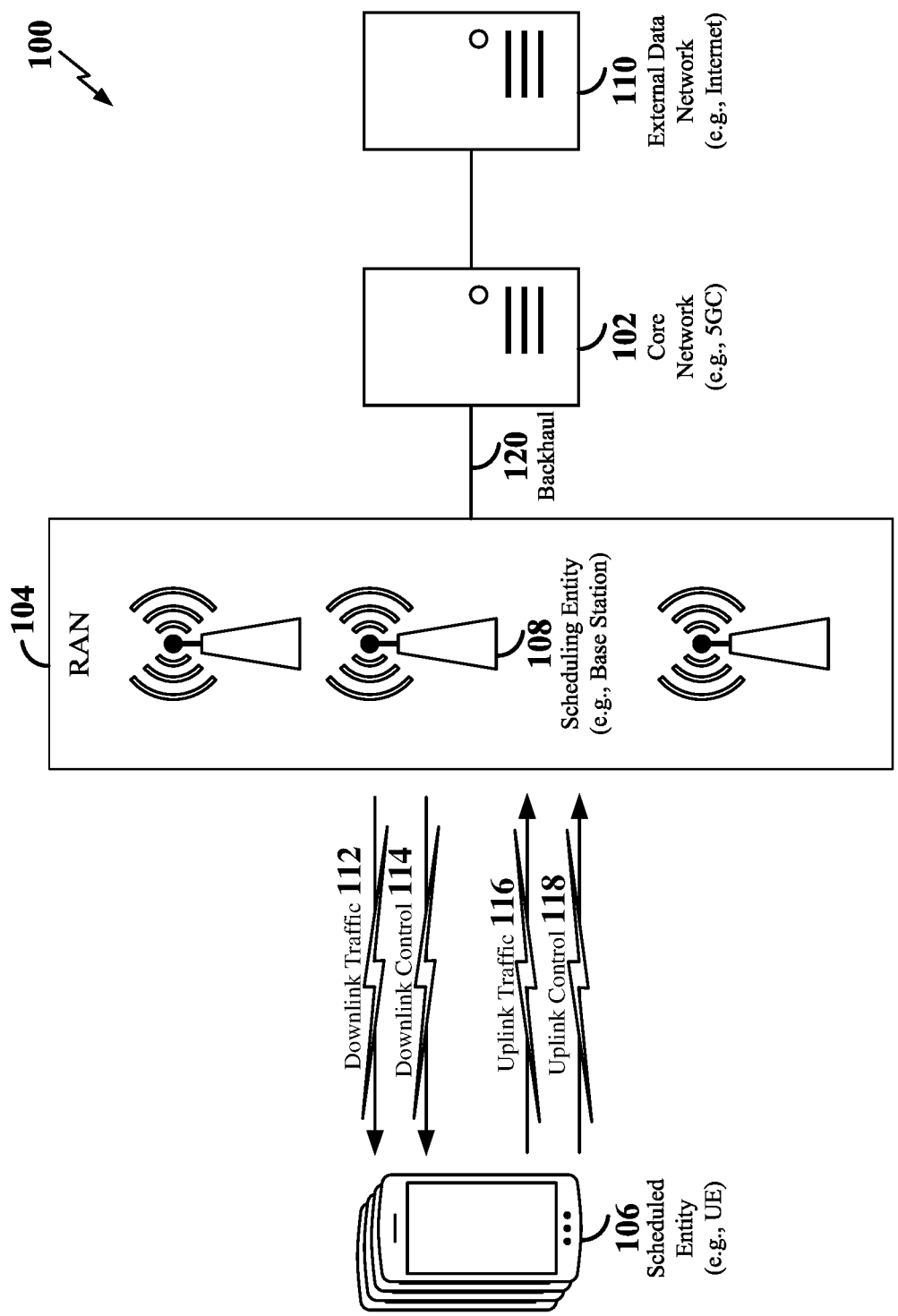
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In wireless communication systems, such as those specified under standards for 5G New Radio (NR), both the base station and wireless communication devices may utilize multiple groupings of component carriers for communications. These groupings may include, for example, a timing advance group, a beamforming group, a dormancy group, a discontinuous reception group, a physical uplink control channel group, and a multiple packet scheduling group. The groupings allow messaging to be simplified so that, for example, a message to set the timing advance to a particular value for one CC is applied to every CC in the same timing advance group.

Various aspects of the disclosure relate to sidelink carrier grouping for wireless communication. A first wireless communication device, such as a user equipment (UE), may communicate with a base station on a cellular link utilizing a first set of first component carriers (CCs) in a particular frequency band. The UE may identify one or more first carrier groupings for the first set of first CCs with the base station. The UE may communicate with a second wireless communication device, such as a second UE, on a sidelink utilizing a second set of CCs within the same frequency band. The first UE may map at least one second CC to a respective corresponding first CC and apply the one or more carrier groupings to the second set of CCs to generate one or more second carrier groupings based on the mapping.

In some examples, the one or more first carrier groupings are identified by receiving an RRC configuration message from the BS. In some examples, the one or more first carrier groupings are applied by applying the one or more first carrier groupings to each CC of the second set of CCs. In some examples, the second set of second CCs are within a sidelink resource pool and the one or more first carrier groupings are applied to each second CC of the second set of second CCs that is within the sidelink resource pool.

In some examples, the one or more second carrier groupings include an additional carrier grouping that includes at least one of the second CCs that does not map to a respective corresponding one of the first CCs. In some examples, the second set of CCs includes more CCs than the first set of CCs. In some examples, the mapping includes mapping each second CC to a respective first CC and the applying includes applying each first CC of the one or more carrier groupings to the respective mapped second CC. In some examples, a plurality of second CCs of the second set of second CCs are mapped to a plurality of first CCs of the first set of first CCs based on a plurality of corresponding group types between respective carrier groupings of the plurality of first CCs and the plurality of second CCs. In some examples, sidelink control information (SCI) is transmitted on the sidelink identifying the second carrier grouping from the first wireless communication device to the second wireless communication device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
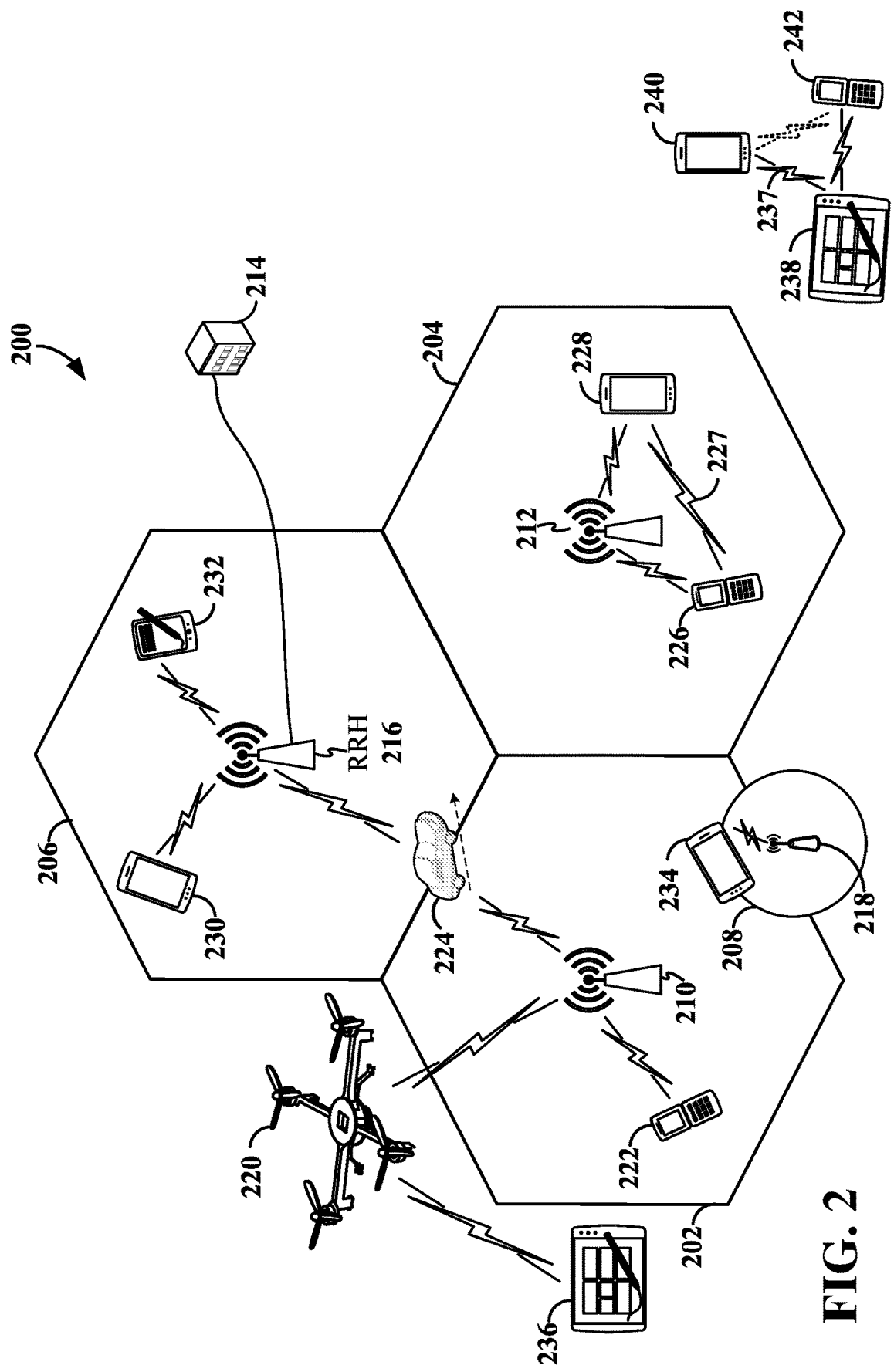
FIG. 2 is a diagram illustrating an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
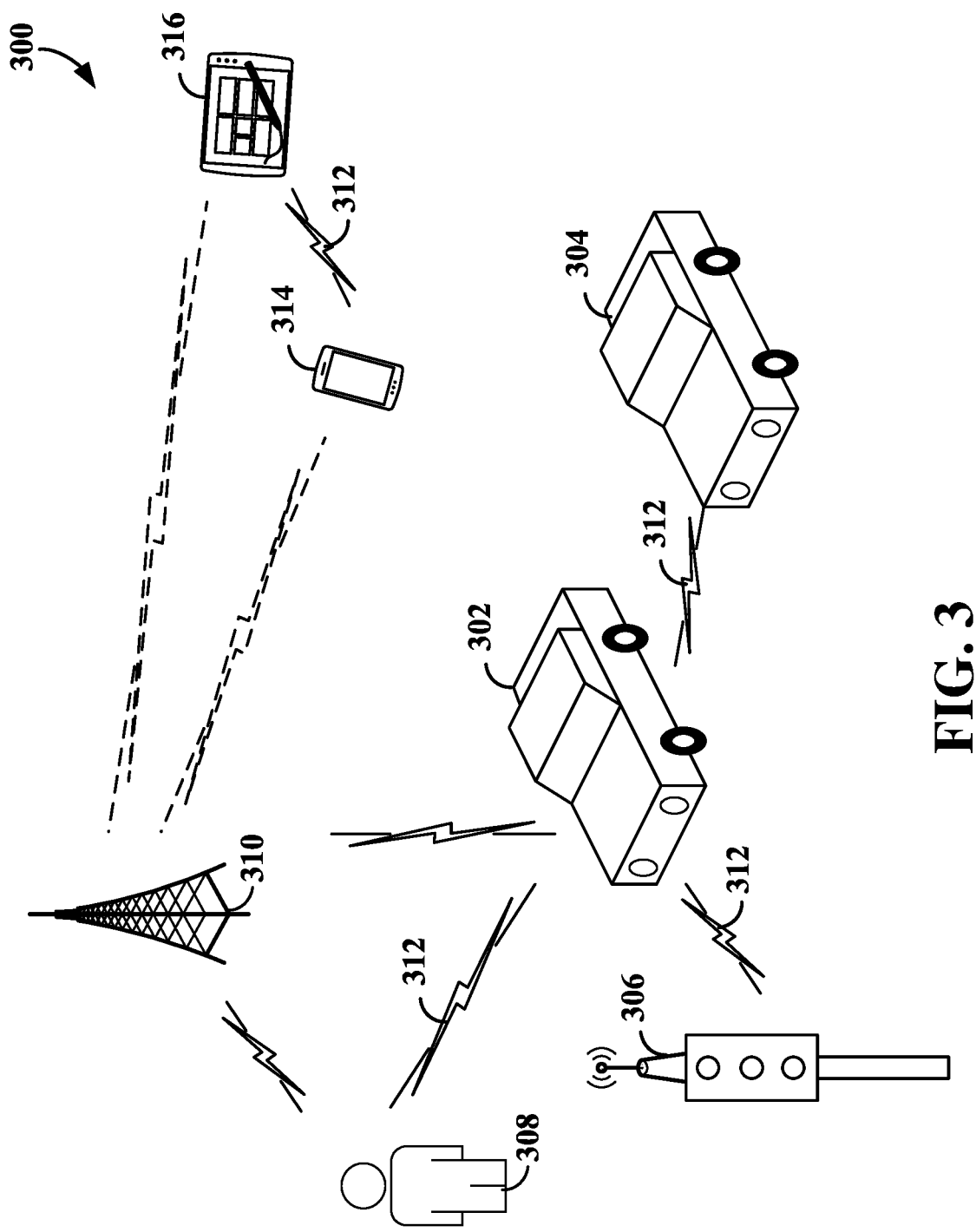
FIG. 3 is a diagram illustrating an example of a vehicle-to-everything (V2X) wireless communication network according to some aspects.

FIG. 3 illustrates an example of a wireless communication network 300 supporting D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

Figure 4:
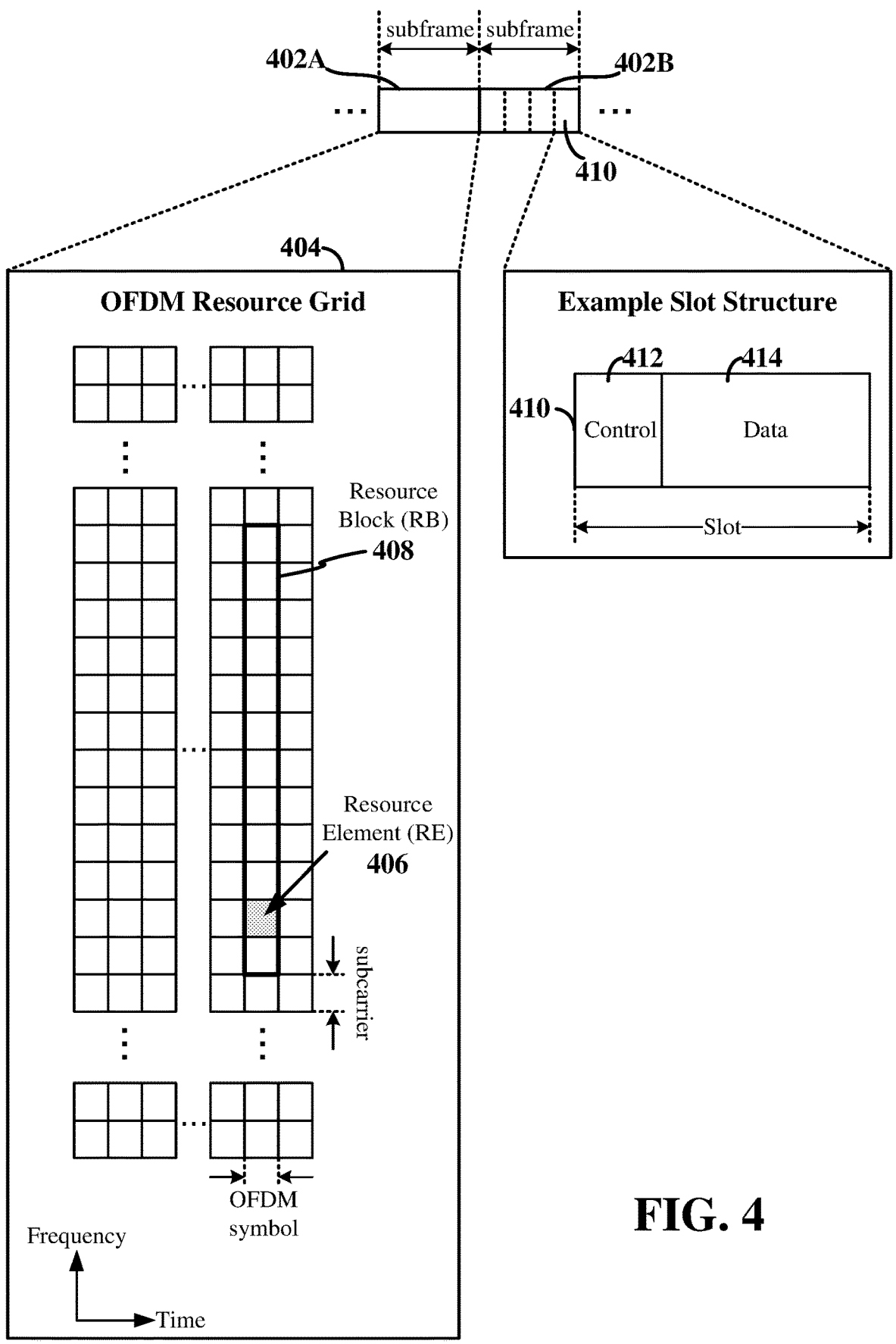
FIG. 4 is a block diagram illustrating wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G-NR networks may further support carrier aggregation (CA) of component carriers transmitted from different cells and/or different transmission and reception points (TRPs) in a multi-cell transmission environment. The different TRPs may be associated with a single base station or multiple base stations. In some aspects, the term component carrier may refer to a carrier frequency (or band) utilized for communication within a cell.

Figure 5:
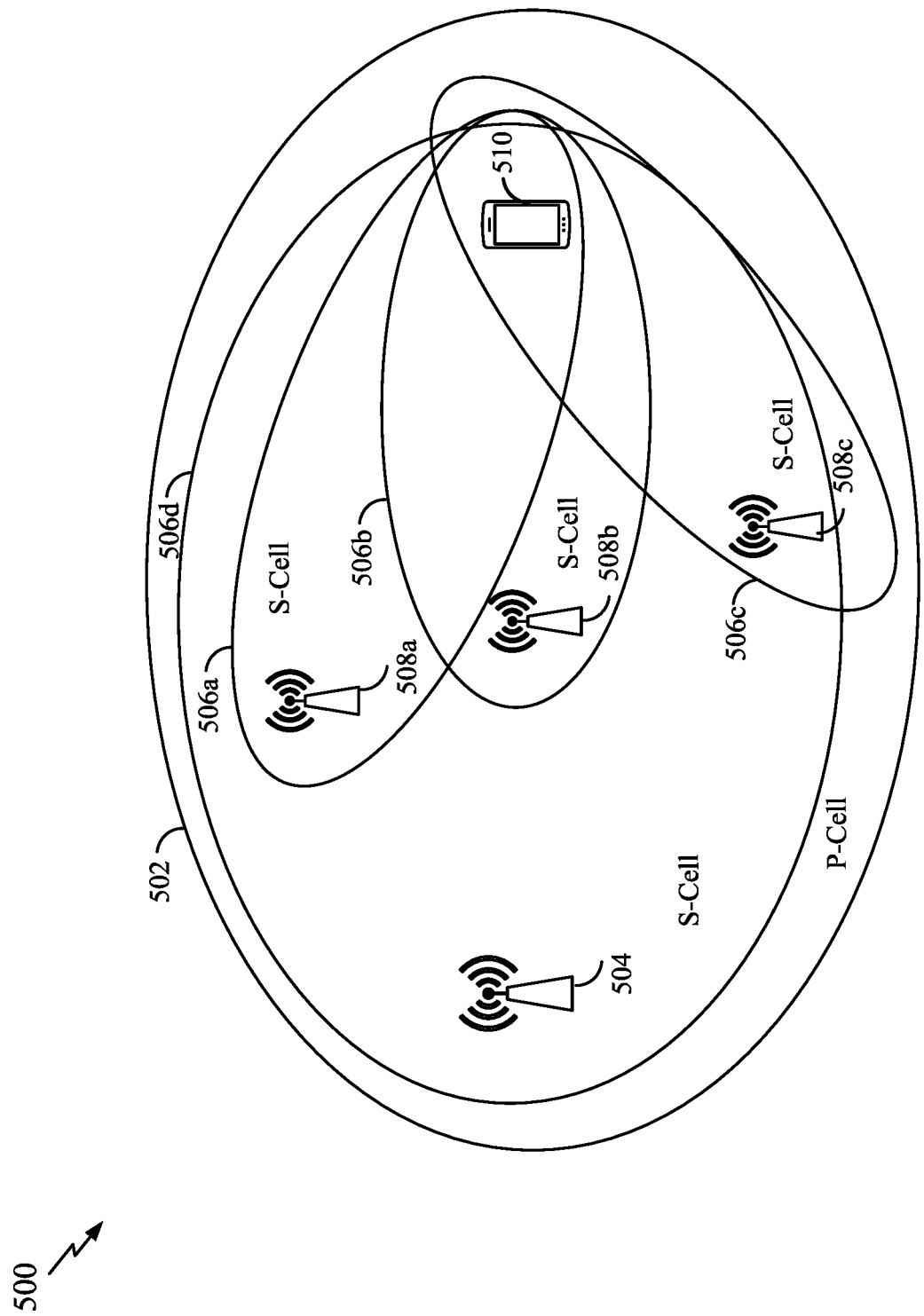
FIG. 5 is a diagram illustrating wireless communication via multiple radio frequency (RF) carriers according to some aspects.

FIG. 5 is a conceptual illustration of a wireless communication system that shows a base station (BS) and a user equipment (UE) communicating via multiple carriers according to some aspects of the disclosure. In particular, FIG. 5 shows an example of a wireless communication system 500 that includes a primary serving cell (PCell) 502 and one or more secondary serving cells (SCells) 506a, 506b, 506c, and 506d. The PCell 502 may be referred to as the anchor cell that provides a radio resource control (RRC) connection to the UE 510. In some examples, the PCell and one or more of the SCells may be co-located (e.g., different TRPs at the same location).

When carrier aggregation is configured in this scenario, one or more of the SCells 506a-506d may be activated or added to the PCell 502 to form the serving cells serving the UE 510. Each serving cell corresponds to a component carrier (CC). The CC of the PCell 502 may be referred to as a primary CC, and the CC of a SCell 506a-506d may be referred to as a secondary CC.

Each of the PCell 502 and the SCells 506 may be served by a respective TRP. For example, the PCell 502 may be served by TRP 504 and each of the SCells 506a-506c may be served by a respective TRP 508a-508c. Each TRP 504 and 508a-508c may be a base station (e.g., gNB), remote radio head of a gNB, or other scheduling entity similar to those illustrated in any of FIG. 1, 2 or 3. In some examples, the PCell 502 and one or more of the SCells (e.g., SCell 506d) may be co-located. For example, a TRP for the PCell 502 and a TRP for the SCell 506d may be installed at the same geographic location. Thus, in some examples, a TRP (e.g., TRP 504) may include multiple TRPs, each corresponding to one of a plurality of co-located antenna arrays, and each supporting a different carrier (different CC). However, the coverage of the PCell 502 and SCell 506d may differ since component carriers in different frequency bands may experience different path loss, and thus provide different coverage.

In some examples, the PCell 502 may add or remove one or more of the SCells 506a-506d to improve reliability of the connection to the UE 510 and/or increase the data rate. The PCell 502 may be changed upon a handover to another PCell.

In some examples, the PCell 502 may be a low band cell, and the SCells 506 may be high band cells. A low band (LB) cell uses a CC in a frequency band lower than that of the high band cells. For example, the high band cells may use millimeter wave (mmW) CC, and the low band cell may use a CC in a band (e.g., sub-6 GHz band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

The disclosure relates in some aspect to sidelink carrier aggregation. Sidelink carrier aggregation may be useful in many wireless communication applications (e.g., 5G NR applications). For example, sidelink carrier aggregation may be used in high data rate application such as network-controlled interactive service (NCIS) applications and V2X applications.

Figure 6:
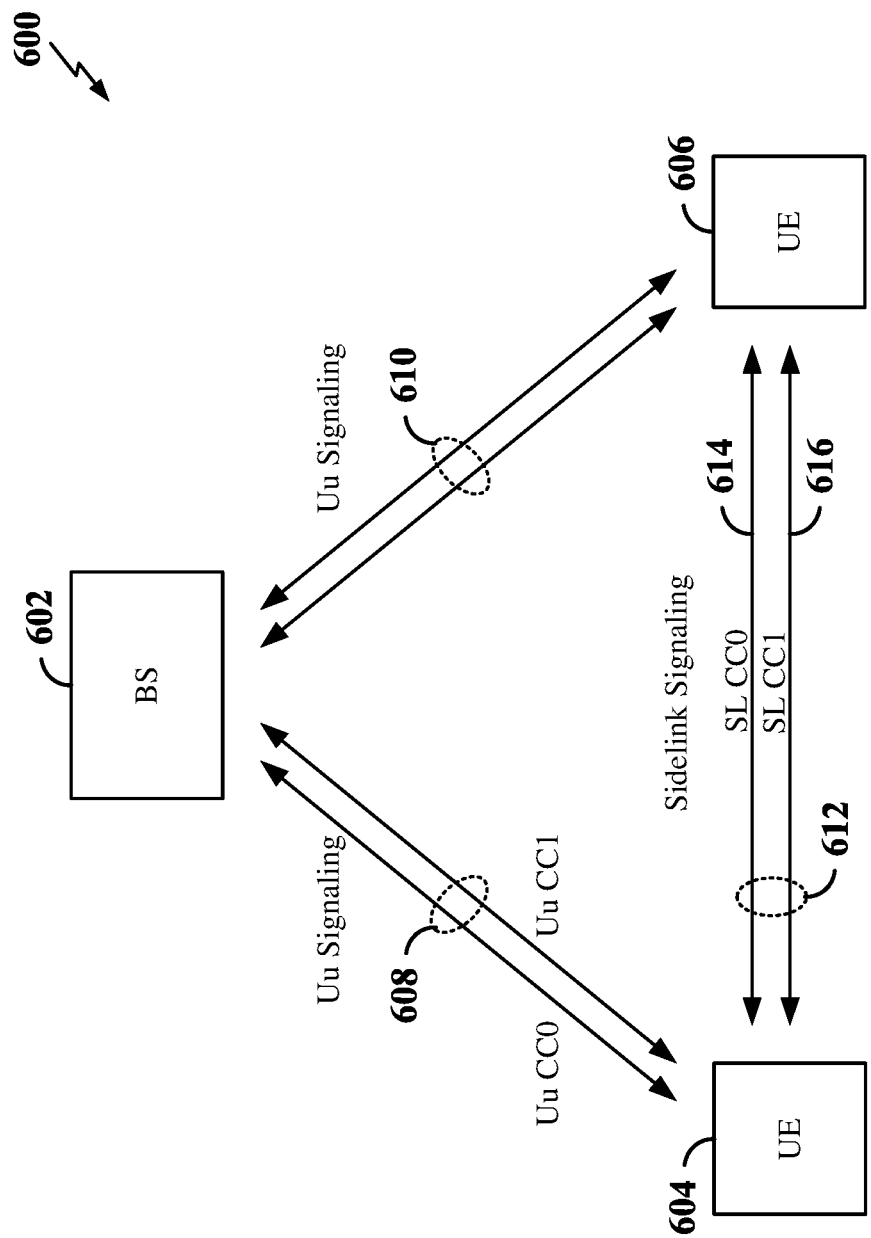
FIG. 6 is a diagram illustrating an example of wireless communication with sidelink carrier aggregation according to some aspects.

FIG. 6 illustrates an example of a wireless communication system 600 including a base station (BS) 602, a first UE 604, and a second UE 606. In some examples, the base station 602 may correspond to any of the base stations or scheduling entities shown in any of FIGS. 1, 2, 3, 5, 6, 7, 8, 9 and 10. In some examples, the first UE 604 and/or the second UE 606 may correspond to any of the UEs or scheduled entities shown in any of FIGS. 1, 2, 3, 5, 6, 7 and 8.

The base station 602 communicates with each of the first UE 604 and the second UE 606 via Uu signaling. The base station 602 may allocate at least one set of component carriers (CCs) for the first UE 604 and/or for the second UE 606. In the example of FIG. 6, the base station 602 allocated a first set of CCs 608 for the first UE 604 and a second set of CCs 610 for the second UE 606. In conjunction with this allocation, the base station 602 defines a set of resources for each CC. For example, a resource allocation by the base station may specify a first frequency band for a first CC (Uu CC0) of the first set of CCs 608 and a second frequency band for a second CC (Uu CC1) of the first set of CCs 608. Thus, the first UE 604 may concurrently transmit data to (or receive data from) the base station 602 via the first CC and the second CC on the designated frequency bands.

In some examples, UEs may establish at least one set of CCs for sidelink communication. In the example of FIG. 6, the first UE 604 and the second UE 606 establish a set of CCs 612 including a first sidelink CC 614 (SL CC0) and a second sidelink CC 616 (SL CC1). These sidelink CCs may operate on a subset of the resources defined for the first set of CCs 608 and/or the second set of CCs 610 for Uu signaling.

For Uu based communication, CCs may be grouped for different purposes. These groupings may be separate from the carrier aggregation and may depend upon different factors, such as signal propagation characteristics, power requirements, bandwidth requirements and other factors. For example, CC groups for Uu CCs may include timing advance groups (TAGs), beamforming groups, dormancy groups, discontinuous reception mode (DRX) groups, PUCCH groups, and multiple-packet scheduling groups. Other group types are also possible, depending on the network implementation.

A TAG is a set of CCs with a common TA command Here, the component carriers (CCs) and/or BWPs assigned to a TAG may have different sub-carrier spacings (SCSs). In this case, the TA may be based on the maximum SCS. For smaller SCSs, the TA is rounded to match the SCS granularity. The carriers in the timing advance group may be all or some of the carriers that are available for aggregation and the particular component carriers of the timing advance group may be selected based on the delay characteristics of the respective signal propagation channel or on other characteristics including the characteristics of other channels used by other nodes. By using two groups, some of the aggregated component carriers may have one timing advance while other aggregated component carriers may have a different timing advance.

Similarly, there may be one or more beamforming groups of component carriers. Beamforming is a signal processing technique that may be used at a transmitting device or a receiving device to shape or steer an antenna beam (e.g., a transmit beam or receive beam) along a spatial path between the transmitter and the receiver. Beamforming may be achieved by combining the signals communicated via antenna elements of an antenna array module such that some of the signals experience constructive interference while others experience destructive interference. To create the desired constructive/destructive interference, the transmitter or receiver may apply amplitude and/or phase offsets to signals transmitted or received from each of the antennas or associated with the transmitter or receiver.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink signals and channels, including the physical uplink control channel (PUCCH), physical uplink shared channel (PUSCH), and sounding reference signal (SRS). In addition, beamformed signals may further be utilized in D2D systems, such as NR sidelink (SL) or V2X, utilizing FR2.

The component carriers of the same beamforming group are assigned the same beamforming characteristics, or in other words, they each utilize the same one or more beams for uplink and/or downlink communication. A single MAC-CE command, for example, can be used to activate or deactivate beams for all of the component carriers in the group. In some instances, multiple beams may be desired for different component carriers instead of a single beam.

Another grouping type is dormancy Dormancy is used to cause otherwise active component carriers to be inactive, reducing power consumption and network interference. The dormancy state may be set or changed by a single bit in downlink control information (DCI). Dormancy groups may also exist as groups under the control of wake up signals (WUS) and ActiveTime configuration. Discontinuous reception (DRX) is another grouping in which some component carriers are turned off in groups. These groupings are made for different reasons than the timing advance or beamforming groups and so component carriers may be grouped differently.

The DCI may also be used by a BS to schedule other types of groups. For example, a carrier indication field (CIF) may be used to assign component carriers to physical uplink control channel (PUCCH) transmissions. There will often be only one component carrier per PUCCH group. CIF may also be used for multiple-packet scheduling in which multiple packets are scheduled to be sent at the same time from a group of component carriers.

For sidelink, there are no defined groups and yet it may be useful to apply groupings to sidelink component carriers. In various aspects of the disclosure, a UE that utilizes sidelink carrier aggregation and is configured with one or more Uu CC groups may be able to identify corresponding sidelink CC groups of different types. These sidelink group types may include, for example, a TAG, a beamforming group, a dormancy group, a DRX group, a physical sidelink control channel (PSSCH) group, and a multiple packet scheduling group. However, there may be other groups as well, depending on the implementation, and the present disclosure is not limited to any particular CC group.

In some examples, in order to establish sidelink CC groups, the UE may map the sidelink CCs to corresponding Uu CCs and then apply the Uu CC groupings to the corresponding mapped sidelink CCs to form the sidelink CC groups. In one example, the network may configure a plurality of the Uu CCs as both Uu and sidelink CCs. In this example, each CC configured as both a Uu CC and sidelink CC may be grouped into sidelink CC groups based on the corresponding Uu CC groups. For example, a sidelink TAG may be formed that includes all of the sidelink CCs within a particular Uu TAG. This has a benefit that no additional configuration is required. It should be understood that depending on the sidelink resource pool allocated by the network, not all Uu CCs may be configured for both Uu and sidelink Thus, the number of sidelink CCs in a particular sidelink CC group may be less than the number of Uu CCs in a corresponding Uu CC group. In addition, there may be more sidelink CCs configured than Uu CCs, and as such, other sidelink CC groups may be formed from the additional sidelink CCs.

In another example, the network may separately configure the Uu CCs and sidelink CCs, such that the center frequency and CC bandwidth may vary between the UU CCs and sidelink CCs. In this example, a UE may map each sidelink CC to a corresponding Uu CC based on the corresponding center frequencies and CC bandwidths and apply the Uu CC groupings to the mapped sidelink CCs to form the sidelink CC groups. For example, a sidelink CC may have a center frequency and CC bandwidth that lies within a CC bandwidth of a Uu CC. In this case, the UE may map the sidelink CC to the Uu CC that contains the sidelink CC.

In another example, the mapping of sidelink CCs to Uu CCs may be different for the different grouping types (purposes). For example, a UE may be configured based on standards or, for example, via RRC signaling, to map each sidelink CC to a corresponding Uu CC for each group type. As an example, a first sidelink CC (e.g., CC-A) may map to a first Uu CC (e.g., CC-1) to form a TAG, and to a second Uu CC (e.g., CC-2) to form a beamforming group. Other custom groupings of sidelink CCs may also be pre-configured.

In an out-of-coverage scenario, the UE may be pre-configured with sidelink CC groups or may derive the sidelink CC groups from signaling (e.g., sidelink control information (SCI)) transmitted on the sidelink by neighboring UEs or a UE configured to generate and broadcast a synchronization reference signal to synchronize UEs on the sidelink (e.g., a syncRef UE).

In some aspects, the mapping is done by a UE before the Uu groups are known to the UE and before the SL groups are formed between two UEs. After a gNB sends the actual Uu CC groups to the UE for use in communication with the gNB, the UE can then apply a pre-determined mapping to determine which SL CCs are in the corresponding SL groups. Further, in some instances, there may be SL CCs that do not fit into any mapping. The outlying SL CCs may be formed into their own SL groups without any relation to any particular Uu CC group.

Figure 7:
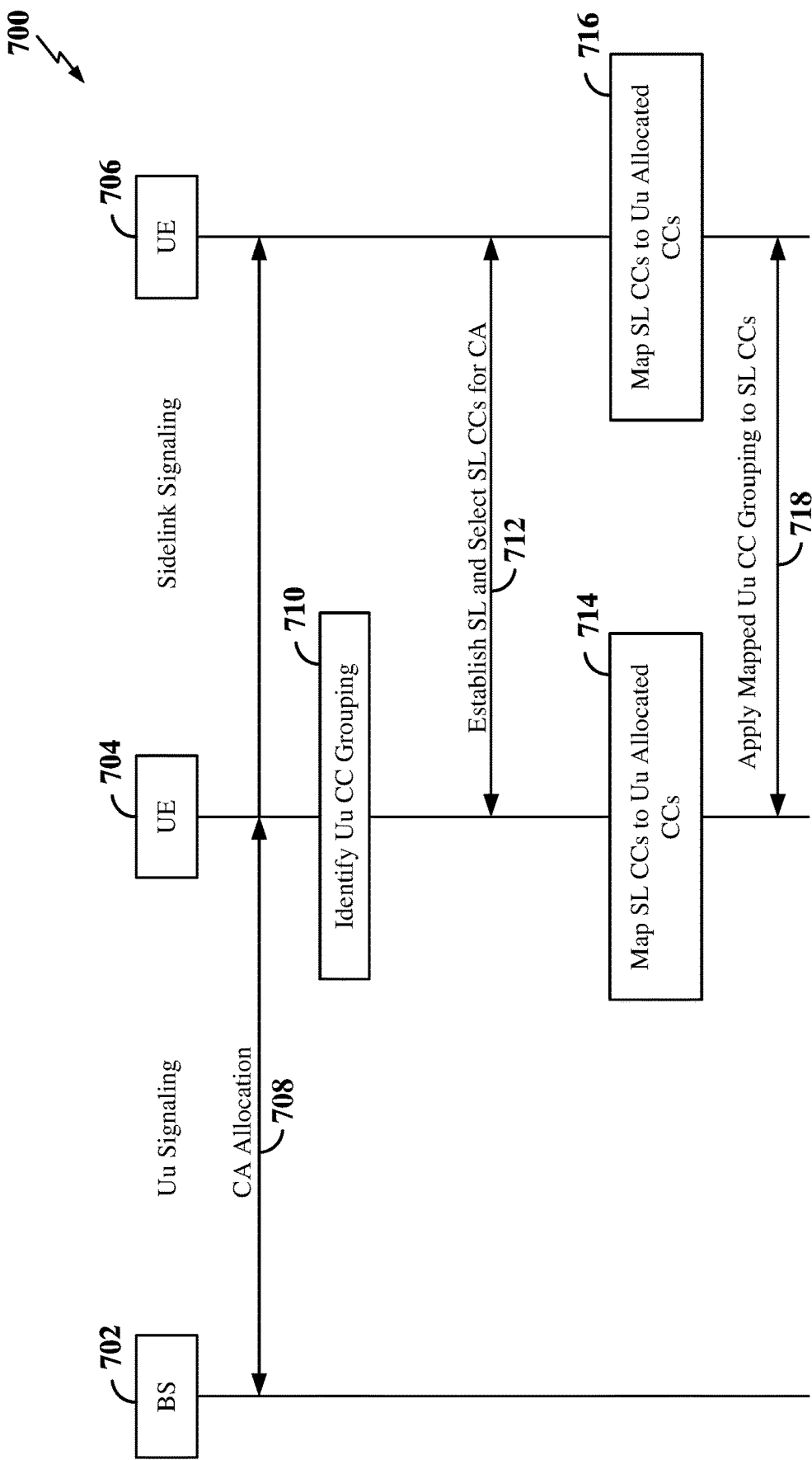
FIG. 7 is a diagram illustrating an example of signaling for sidelink carrier component grouping based on downlink configuration according to some aspects.

FIG. 7 illustrates an example of signaling 700 in a wireless communication network including a base station (BS) 702, a first UE 704, and a second UE 706. In some examples, the base station 702 may correspond to any of the base stations or scheduling entities shown in any of FIG. 1, 2, 3, 5, 6, 9, 10, or 13. In some examples, the first UE 704 and/or the second UE 706 may correspond to any of the UEs or scheduled entities shown in any of FIG. 1, 2, 3, 5, 6, 7, 9, 10, or 11.

At step 708 of FIG. 7, the BS 702 is in communication with the first UE 704 and also with the second UE 706. In the process of this communication, the BS 702 allocates resources for carrier aggregation (CA) and independently sends an indication of the CA resource allocation to the first UE 704 and the second UE 706. For example, the BS 702 may allocate a first set of CCs for Uu-based carrier aggregation to the first UE 702 and a second set of CCs for Uu-based carrier aggregation to the second UE 706. The BS 702 may also establish groupings of the CCs for different purposes, such as a timing advance group, a beamforming group, a dormancy group, a discontinuous reception group, a physical uplink control channel (PUCCH) group, and a multiple packet scheduling group, among others. In some examples, the BS 702 may also specify CCs to be used for sidelink-based carrier aggregation. The BS 702 may transmit the CA information and CC grouping information (and optional sidelink carrier aggregation information) using one or more of an RRC configuration message, a DCI, a CIF of a DCI, or other signaling.

At step 710, the first UE 702, identifies one or more carrier groupings that have been allocated by the BS for the Uu CCs from the CC grouping information received at step 708. These groupings may be for any of the purposes mentioned above. In some examples, the Uu CCs included in the different groups may be the same. In other examples, the Uu CCs may differ between two or more of the groups.

At step 712, the first UE 704 and the second UE 706 may establish a sidelink (SL) and select two or more sidelink CCs for sidelink CA. Here, the first UE 704 and the second UE 706 may elect to use SL CC_A, SL CC_B, and SL CC_C for the sidelink CA connection. In some examples, the SL CCs selected for sidelink CA may be different than the Uu CCs selected for Uu CA.

At step 714, the first UE 704 maps at least one SL CC to a respective corresponding Uu CC. In some implementations, the UE 704 may map a SL CC to a Uu CC that has the exact same carrier frequency and bandwidth. In some implementations, the bandwidths may be different but the UE 704 may map the selected SL CC to the Uu CC that includes the center frequency of the SL CC. In some implementations, the mapping may be configured based on the group type or other suitable rationale.

In some examples, the mapping may be different for different groups. As an example, for the purpose of timing advance grouping (TAG), the mapping between Uu CCs and SL CCs may be is CC_1 to CC_A, CC_2 to CC_B and CC_3 to CC_C. At the same time, for the purpose of beamforming, the mapping between Uu CC and SL CC may be CC_3 to CC_A, CC_2 to CC_B and CC_1 to CC_C. The mapping may be defined by the BS 702, pre-configured, or determined in another way.

For a particular group, a selected SL CC, e.g., CC_A, is used to determine a particular Uu CC, e.g. CC_1 for the particular grouping. The UE 704 then determines the other Uu CCs which are grouped together with Uu CC_1, e.g., CC_3, CC_4, CC_5.

At step 716 the second UE 706 does a similar mapping of the SL CCs used to communicate with the first UE 704 to the Uu allocated CCs. The mapping of the second UE 706 of the SL CCs to Uu CCs at step 716 may be different from that of the first UE 704 at step 714.

At step 718, this list of CCs, e.g., CC_1, CC_3, CC_4, CC_5 is then applied to the SL CCs to generate the SL CC groupings for the particular group, e.g., CC_A, CC_C, CC_D, CC_E to which the corresponding Uu CC belongs. In some examples, each UE 704 and 706 may independently determine the sidelink groups as shown as 714, 716. In other examples, one UE (e.g., UE 704) may communicate the sidelink groups to another UE (e.g., UE 706) for use in communicating on the sidelink.

A simplified mapping is illustrated by Table 1 in which a Uu group (e.g., Uu Group 1) has two CCs, indicated as CC_1 and CC_2. The SL has a CC indicated as CC_A, which is mapped to CC_1, but does not have a CC that maps to CC_2. When such a mapping is used, applying the Uu group to the SL results in only CC_A being in a corresponding sidelink group (e.g., SL Group A), because there is no SL CC that corresponds to CC_2.

TABLE 1

| Uu CCs | Uu Group | SL CCs | SL Group |
|---|---|---|---|
| CC_1 | 1 | CC_A | A |
| CC_2 | 1 | | |

Another simplified mapping is illustrated by Table 2 in which a Uu group (e.g., Uu Group 2) has two CCs indicated as CC_3 and CC_4. The SL has CCs indicated as CC_B, CC_C, and CC_D. CC_C is mapped to CC_3 and CC_D is mapped to CC_4. When Uu Group 2 is applied to this SL mapping, CC_C and CC_D are placed in a corresponding SL group (e.g., SL Group C). The additional SL CC (CC_B) does not map to Uu CC, and therefore, is placed in a different SL group (e.g., SL Group B).

TABLE 2

| Uu CCs | Uu Group | SL CCs | SL Group |
|---|---|---|---|
|  |  | CC_B | B |
| CC_3 | 2 | CC_C | C |
| CC_-4 | 2 | CC_D | C |

Figure 8:
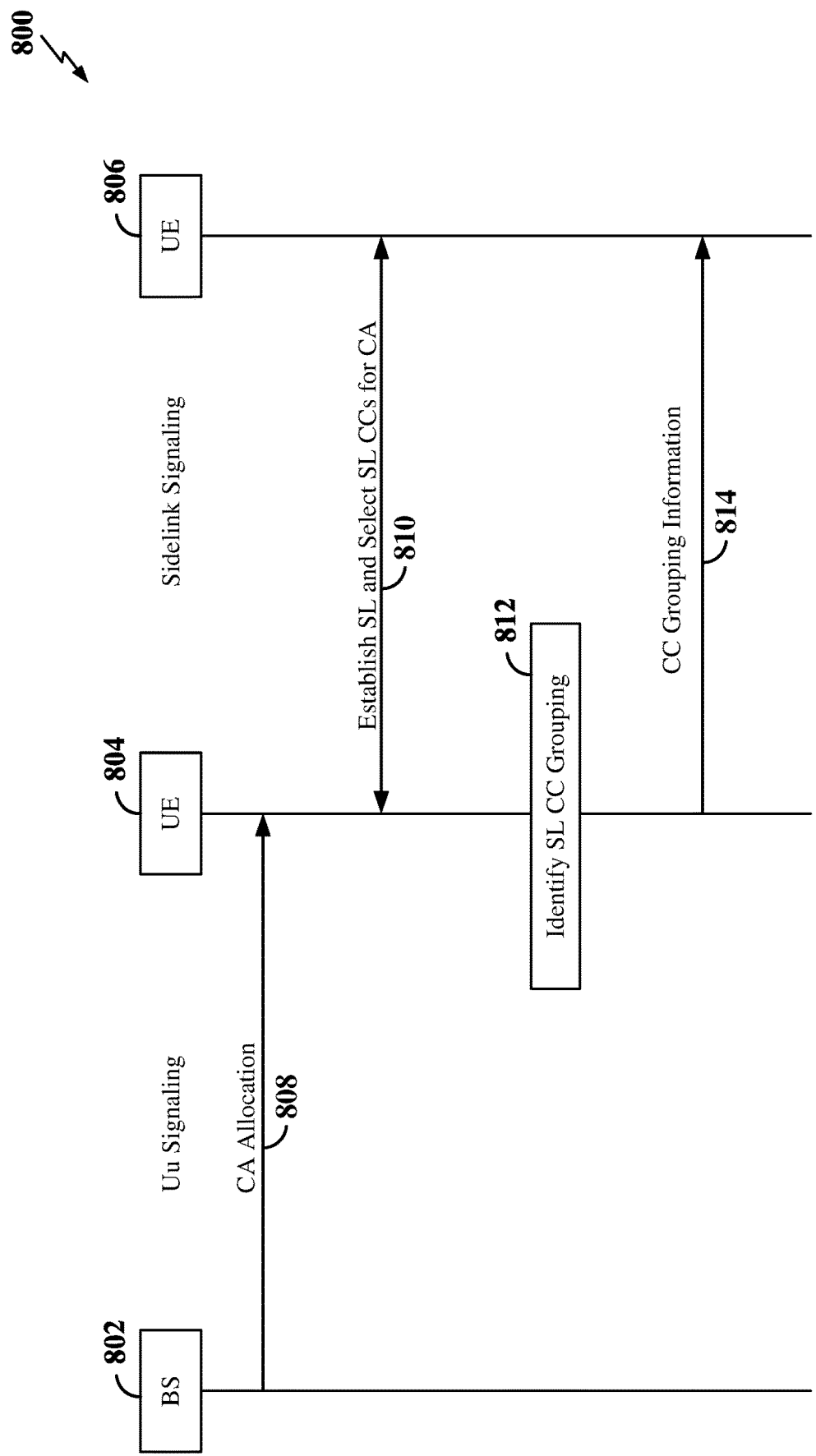
FIG. 8 is another diagram illustrating an example of signaling for sidelink carrier component grouping according to some aspects.

FIG. 8 illustrates an example of signaling 800 in a wireless communication network including a base station (BS) 802, a first UE 804, and a second UE 806. In some examples, the base station 802 may correspond to any of the base stations or scheduling entities shown in any of FIG. 1, 2, 3, 5, 6, 8, 10, or 13. In some examples, the first UE 804 and/or the second UE 806 may correspond to any of the UEs or scheduled entities shown in any of FIG. 1, 2, 3, 5, 6, 7, 8, 9, or 10.

At step 808 of FIG. 8, the BS 802 sends carrier aggregation information and CC grouping information to the first UE 804 for communication with the BS. For example, the BS 802 may allocate Uu CCs for carrier aggregation (CA) and group the different Uu CCs for various purposes. There may be a variety of different types of groupings as discussed above, such as a timing advance group, a beamforming group, a dormancy group, a discontinuous reception group, a physical uplink control channel (PUCCH) group, and a multiple packet scheduling group, among others. In some examples, the BS 802 may also specify CCs to be used for sidelink-based carrier aggregation. The BS 802 may transmit the CA information and CC grouping information (and optional sidelink carrier aggregation information) using one or more of an RRC configuration message, a DCI, a CIF of a DCI, or other signaling.

At step 810, the first UE 804 and the second UE 806 may establish a sidelink (SL) and select two or more sidelink CCs for sidelink CA. The SL CCs may be the same or different from Uu CCs.

At step 812, the first UE 804, identifies one or more sidelink CC groupings. These groupings may be obtained from the BS or determined based on mappings as described above. These groupings may be different for different purposes as described above.

At step 814, the first UE 804 sends sidelink CC grouping information to the second UE 806 indicating the sidelink CC groups identified by the UE 804. The grouping is relayed to the second UE 806 for use in communicating on the sidelink. In some implementations, sidelink control information (SCI) is used to transmit the CC grouping information.

Figure 9:
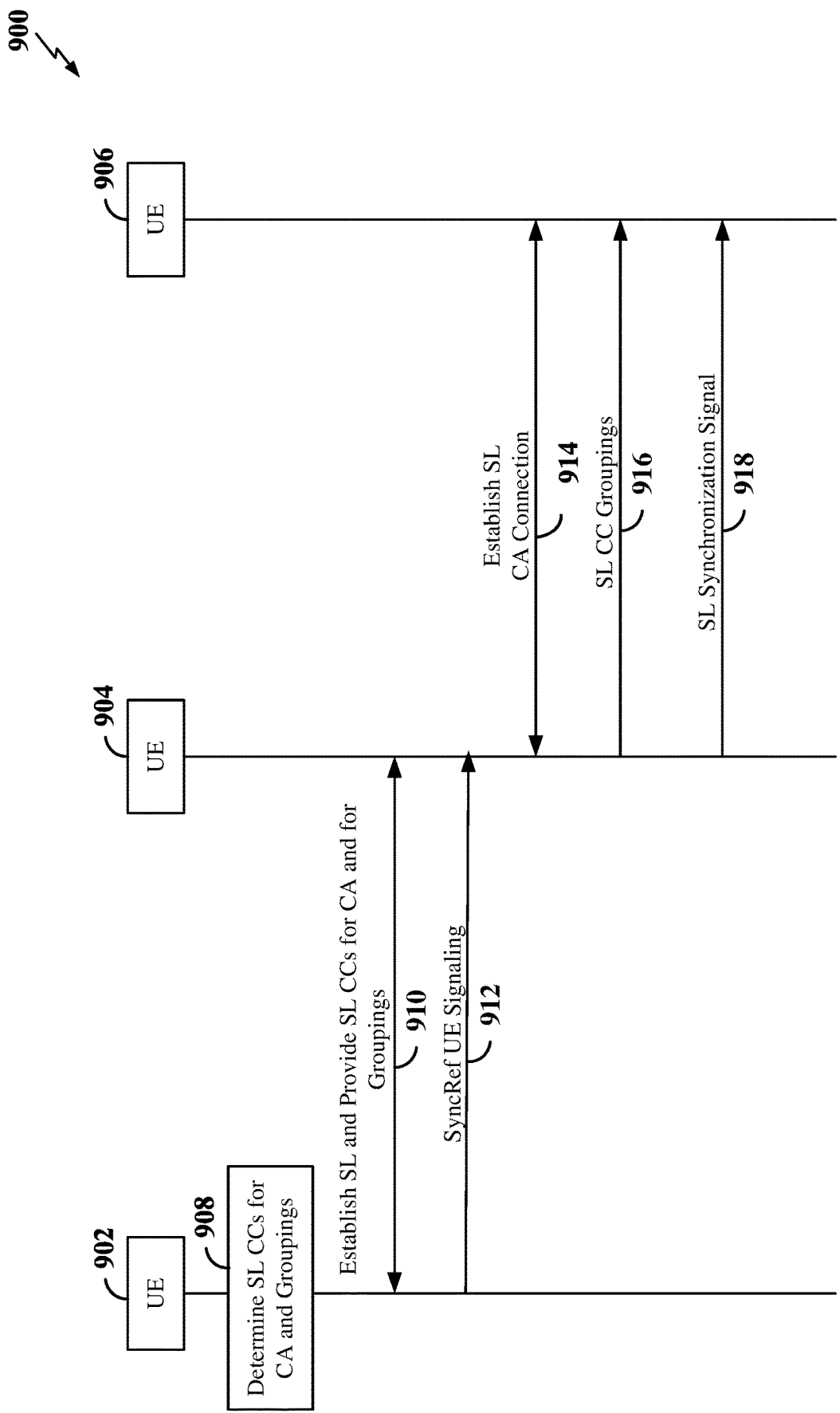
FIG. 9 is a diagram illustrating an example of signaling for out of coverage sidelink carrier component grouping according to some aspects.

FIG. 9 illustrates an example of signaling 900 in a wireless communication network including a first UE 902, a second UE 904, and a third UE 906. In some examples, the first UE 902, the second UE 904, and the third UE 906 may correspond to any of the UEs shown in any of FIG. 1, 2, 3, 5, 6, 7, 8, 9, or 10. In this example, the first UE 902 may be a SyncRef UE that has an internal clock synchronized to a synchronization source. For example, the synchronization source may be a gNB, global navigation satellite system (GNSS), global positioning system (GPS), or other suitable synchronization source.

At step 908 of FIG. 9, the first UE 902 may determine the SL CCs for carrier aggregation and one or more sidelink CC groupings for the SL CCs. The first UE 902 may be pre-configured with the SL CCs for CA and the SL CC groupings, may receive this information from a gNB, or may determine the SL CCs and groupings in another way.

At step 910, the first UE 902 and the second UE 904 may establish a SL therebetween and the second UE 904 may receive the SL CCs for carrier aggregation and the one or more SL CC groupings from the first UE 902. For example, the first UE 902 and second UE 904 may establish a sidelink therebetween and communicate the SL CCs and SL CC groupings as part of the sidelink establishment.

At step 912, the second UE 904 may receive a synchronization reference signal from the first UE 902 to synchronize the radio frame timing on the sidelink between the first UE 902 and the second UE 904. For example, the first UE 902 may generate and transmit a first sidelink synchronization signal (S-SS) based on the synchronization established with the synchronization source.

At step 914, the second UE 904 and the third UE 906 may establish a SL therebetween and select the SL CCs for sidelink CA. In some examples, the SL CCs utilized for sidelink CA between the second UE 904 and the third UE 906 are the same as the SL CCs utilized for sidelink CA between UE 902 and UE 904. In other examples, the SL CCs utilized for sidelink CA may vary between the two sidelinks.

At step 916, the second UE 904 may transmit the one or more sidelink CC groupings to the third UE 906. These groupings may be used for various purposes, such as timing advance, beamforming, dormancy, discontinuous reception, and other purposes as mentioned above.

At step 918, in scenarios where the second UE 904 and the third UE 906 are out-of-coverage, the second UE 904 may further generate and transmit a second S-SS based on the synchronization established with the first UE 902 to synchronize the timing of the third UE 906.

Figure 10:
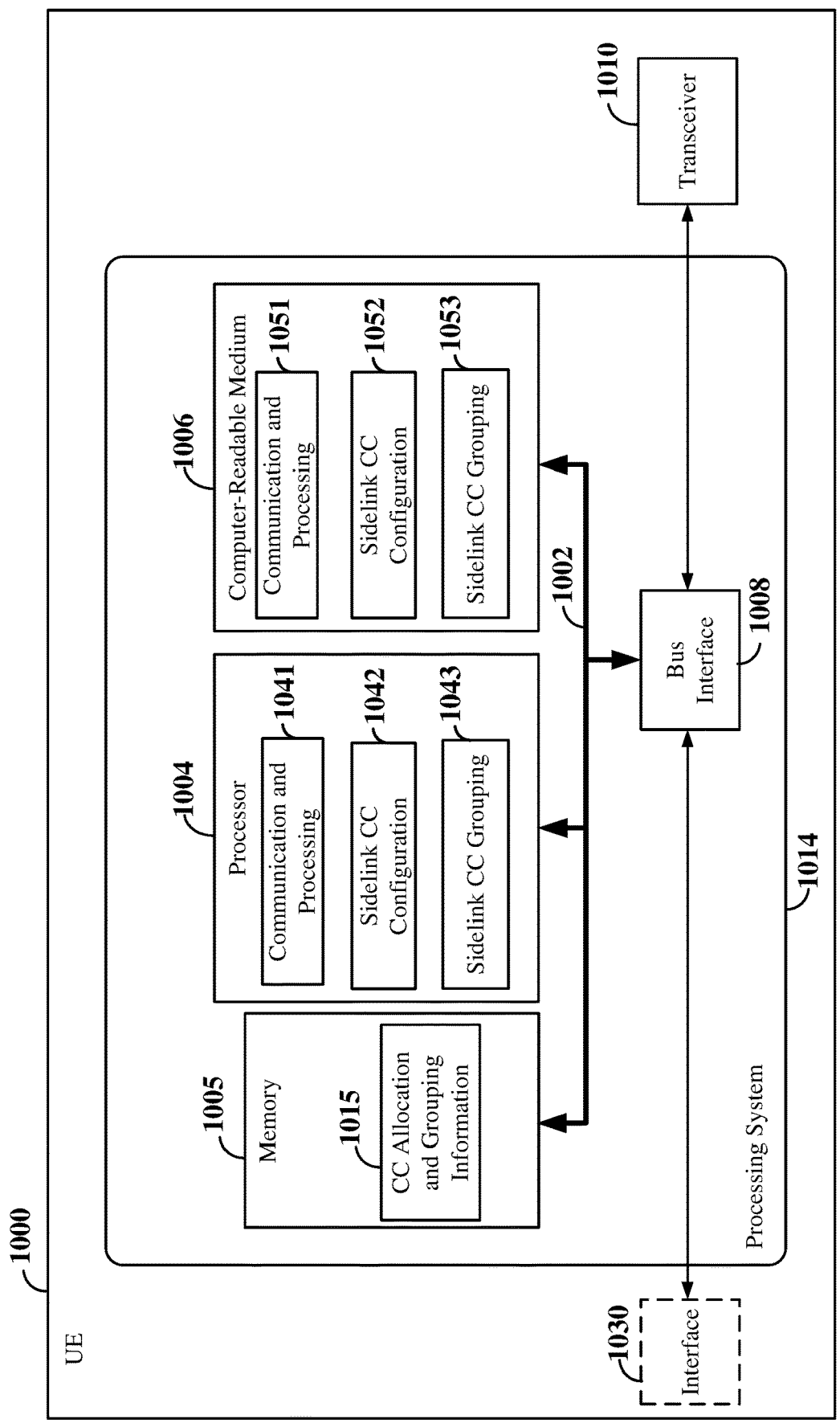
FIG. 10 is a block diagram illustrating an example of a hardware implementation for a UE employing a processing system according to some aspects.

FIG. 10 is a block diagram illustrating an example of a hardware implementation for a UE 1000 employing a processing system 1014. For example, the UE 1000 may be a sidelink device or other device configured to wirelessly communicate with a base station, as discussed in any one or more of FIGS. 1-9. In some implementations, the UE 1000 may correspond to any of the UEs or scheduled entities shown in any of FIG. 1, 2, 3, 5, 6, 7, 8, 9, or 10.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the UE may include two or more transceivers 1010, each configured to communicate with a respective network type (e.g., terrestrial, or non-terrestrial). The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIGS. 11-13). In some aspects of the disclosure, the processor 1004, as utilized in the UE 1000, may include circuitry configured for various functions.

The processor 1004 is coupled to the memory 1005 through the bus 1002. The memory includes component carrier allocation and grouping information 1015 that may be used for carrier aggregation and which may also include tables, maps or other data structures that indicate the component carriers for each of multiple different types of groups. The component carrier groupings may be stored in the memory 1005 for both Uu and SL groupings.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some examples, the communication and processing circuitry 1041 may be configured to generate and transmit a scheduling request (e.g., via UCI in a PUCCH) to the base station to receive an uplink grant for the PUSCH. The communication and processing circuitry 1041 may further be configured to generate an uplink signal and interact with the transceiver 1010 to transmit the uplink signal. The uplink signal may include, for example, a PUCCH, a PUSCH, an SRS, a DMRS, or a PRACH. The communication and processing circuitry 1041 may further be configured to interact with the transceiver 1010 to monitor for a downlink signal and decode a downlink signal. The downlink signal may include, for example, a PDCCH, a PDSCH, a CSI-RS, or a DMRS.

The communication and processing circuitry 1041 is also configured to communicate over a sidelink carrier to exchange sidelink control information and sidelink data with other sidelink devices. In some examples, the communication and processing circuitry 1041 may be configured to transmit a PSCCH, which may include a sidelink synchronization signal block (S-SSB), other control information, and/or pilot signals, and/or a PSSCH, which may include sidelink data, within a radio frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS as described herein).

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., means for transmitting).

The processor 1004 may include sidelink CC configuration circuitry 1042 configured to perform sidelink CC mapping-related operations as discussed herein. The sidelink CC configuration circuitry 1042 may include functionality for a means for identifying at least one first carrier grouping for a first set of first component carriers with a base station. The sidelink CC configuration circuitry 1042 may include functionality for a means for mapping at least one second component carrier to a respective corresponding first component carrier. The sidelink CC configuration circuitry 1042 may include functionality for a means for identifying a UE as a synchronization reference. The sidelink CC configuration circuitry 1042 may include functionality for a means for receiving an indication specifying that a timing reference is to be based on uplink timing. The sidelink CC configuration circuitry 1042 may include functionality for a means for determining that uplink timing or downlink timing is to be used as a default reference for a timing reference. The sidelink CC configuration circuitry 1042 may further be configured to execute sidelink CC configuration software 1052 included on the computer-readable medium 1006 to implement one or more functions described herein.

The processor 1004 may include sidelink CC grouping circuitry 1043 configured to perform sidelink CC grouping-related operations as discussed herein. The sidelink CC grouping circuitry 1043 may include functionality for a means applying the at least one first carrier grouping to the second set of second component carriers to generate at least one second carrier grouping based on the mapping. The sidelink CC grouping circuitry 1043 may further be configured to execute sidelink CC grouping software 1053 included on the computer-readable medium 1006 to implement one or more functions described herein.

Figure 11:
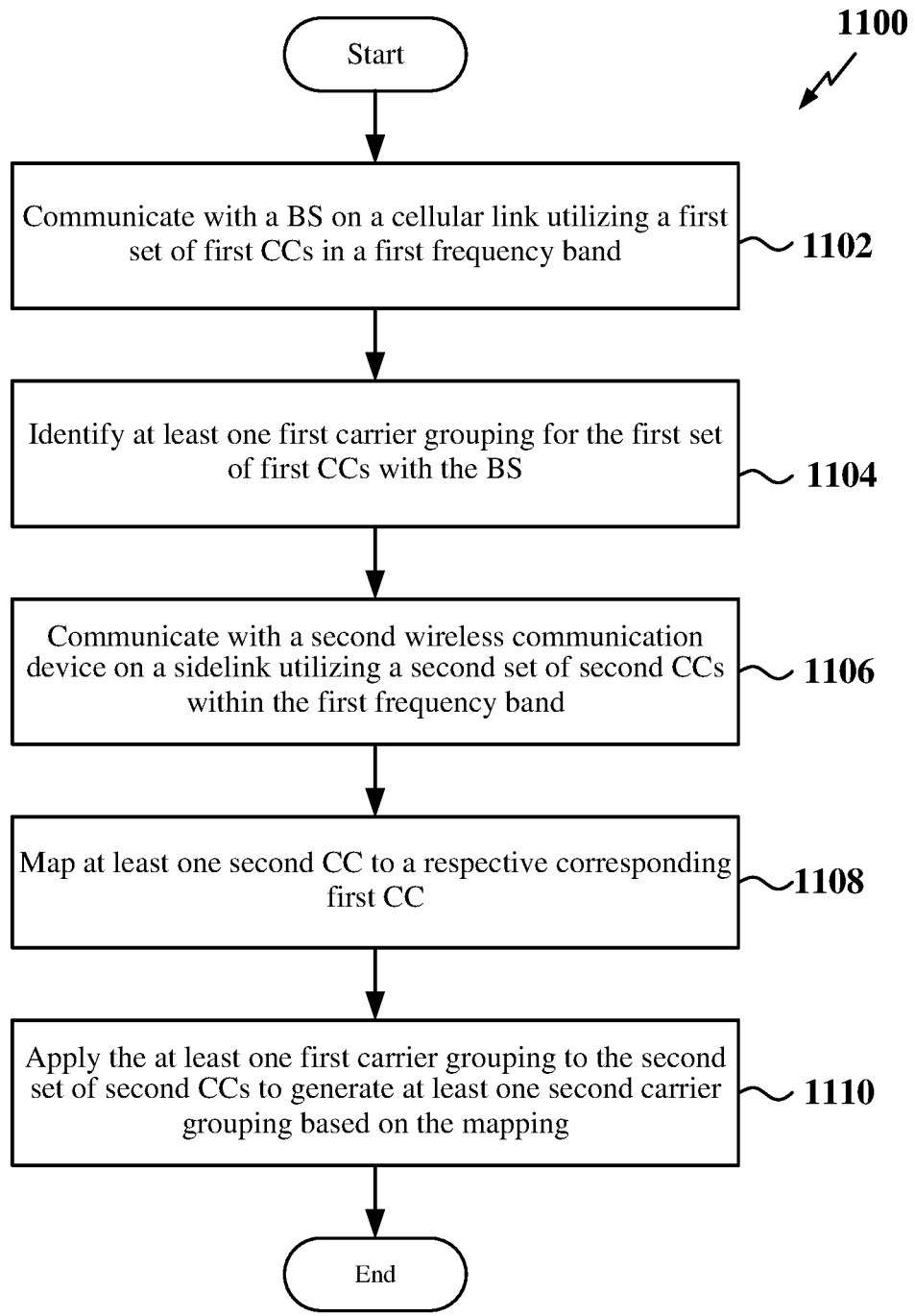
FIG. 11 is a flow chart of an example sidelink carrier component grouping method according to some aspects.

FIG. 11 is a flow chart illustrating an example method 1100 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1100 may be carried out by the UE 1000 illustrated in FIG. 10. In some examples, the method 1100 may be carried out by any suitable apparatus or means for carrying out the functions or algorithm described below.

At block 1102, a UE may communicate with a BS on a cellular link utilizing a first set of first CCs in a first frequency band. For example, the communication and processing circuitry 1041, shown and described above in connection with FIG. 10, communicates using carrier aggregation in the uplink and downlink channels and may receive information about how to aggregate sidelink CCs, such as aggregating at least two component carriers of the set of the component carriers for utilization in communicating with the second wireless communication device, which may be the BS or UE. The communication and processing circuitry also receives component carrier information and component carrier grouping information for the uplink and downlink channels from the BS. This information may be stored in the memory 1005, for example in the CC allocation and grouping memory.

At block 1104, the UE may identify at least one first carrier grouping for the first set of first component carriers with the base station. For example, the sidelink CC configuration circuitry 1042 shown and described above in connection with FIG. 10, may operate to identify and organize all of the particular groupings for the Uu CCs.

At block 1106, the UE may communicate with a second wireless communication device on a sidelink utilizing a second set of second component carriers within the first frequency band. For example, communication and processing circuitry 1041 together with the transceiver 1010, shown and described above in connection with FIG. 10, may cooperate with a transmitter or transceiver (e.g., which may be the same as or different from the transmitter or transceiver referenced above at block 1102) to establish and communicate over the sidelink.

At block 1108, the UE may map at least one second CC to a respective corresponding first CC. For example, the sidelink CC grouping circuitry 1043 in cooperation with the CC allocation and grouping information 1015 may map one or more of the sidelink CCs to Uu CCs.

At block 1110, the UE may apply the at least one first CC to the second set of second CCs to generate at least one second carrier grouping based on the mapping. For example, the sidelink CC grouping circuitry 1043 in cooperation with the CC allocation and grouping information 1015 may generate groupings of SL CCs for different types of groups using the mappings of block 1108.

In some embodiments, identifying the at least one first carrier grouping comprises receiving a Radio Resource Control (RRC) configuration message from the base station. In some embodiments, the method further includes communicating with a base station on a cellular link utilizing a third set of third component carriers in a second frequency band. The processor and the memory are configured to identify at least one third carrier grouping for the third set of third component carriers with the base station, communicate with the second wireless communication device on a sidelink utilizing a fourth set of fourth component carriers within the second frequency band, map at least one fourth component carrier to a respective corresponding third component carrier, and apply the at least one second carrier grouping to the fourth set of fourth component carriers to generate at least one fourth carrier grouping based on the mapping.

In some embodiments, the first frequency band is higher than the second frequency band. In some embodiments, applying the at least one first carrier grouping comprises applying the at least one first carrier grouping to each component carrier of the second set of component carriers. In some embodiments, the second set of second component carriers are within a sidelink resource pool and applying the at least one first carrier grouping comprises applying the at least one first carrier grouping to each second component carrier of the second set of second component carriers that is within the sidelink resource pool.

In some embodiments, at least one second carrier grouping comprises an additional carrier grouping including at least one of the second component carriers that does not map to a respective corresponding one of the first component carriers. In some embodiments, the second set of component carriers includes more component carriers than the first set of component carriers.

In some embodiments, the mapping comprises mapping each second component carrier to a respective first component carrier and wherein the applying comprises applying each first carrier grouping of the at least one first carrier grouping to the respective mapped second component carriers.

In some embodiments, the identifying comprises identifying the first carrier grouping including a third carrier grouping of a first type and a fourth carrier grouping of a second type for a first one of the first component carriers and wherein the applying comprises applying the third carrier grouping and the fourth carrier grouping to the corresponding mapped second component carrier. In some embodiments, the first type comprises at least one of a timing advance group, a beamforming group, a dormancy group, a discontinuous reception group, a physical uplink control channel group, and multiple packet scheduling group and wherein the second type comprises another one of a timing advance group, a beamforming group, a dormancy group, a discontinuous reception group, a physical uplink control channel group, and multiple packet scheduling group.

In some embodiments, the third carrier grouping includes a first subset of the first component carriers and the fourth carrier grouping includes a second subset of the first component carriers. In some embodiments, the mapping the at least one second component carrier to the respective corresponding first component carrier includes mapping a plurality of second component carriers of the second set of second component carriers to a plurality of first component carriers of the first set of first component carriers based on a plurality of corresponding group types between respective carrier groupings of the plurality of first component carriers and the plurality of second component carriers.

Some embodiments further include transmitting sidelink control information (SCI) on the sidelink identifying the second carrier grouping from the first wireless communication device to the second wireless communication device. In some embodiments communicating with the second wireless communication device further comprises communicating with the second wireless communication device by aggregating at least two of the second component carriers of the second set of second component carriers within the first frequency band.

In some embodiments, the second set of component carriers each utilize a same physical bandwidth and frequency as a corresponding one of the first set of first component carriers. Some embodiments further include receiving the second set of component carriers in an RRC configuration message from the base station. In some embodiments, each first component carrier comprises a respective first bandwidth and each second component carrier comprises a respective second bandwidth, and wherein the mapping comprises mapping each second component carrier to a corresponding first component carrier for which the respective first bandwidth comprises the respective second bandwidth.

Figure 12:
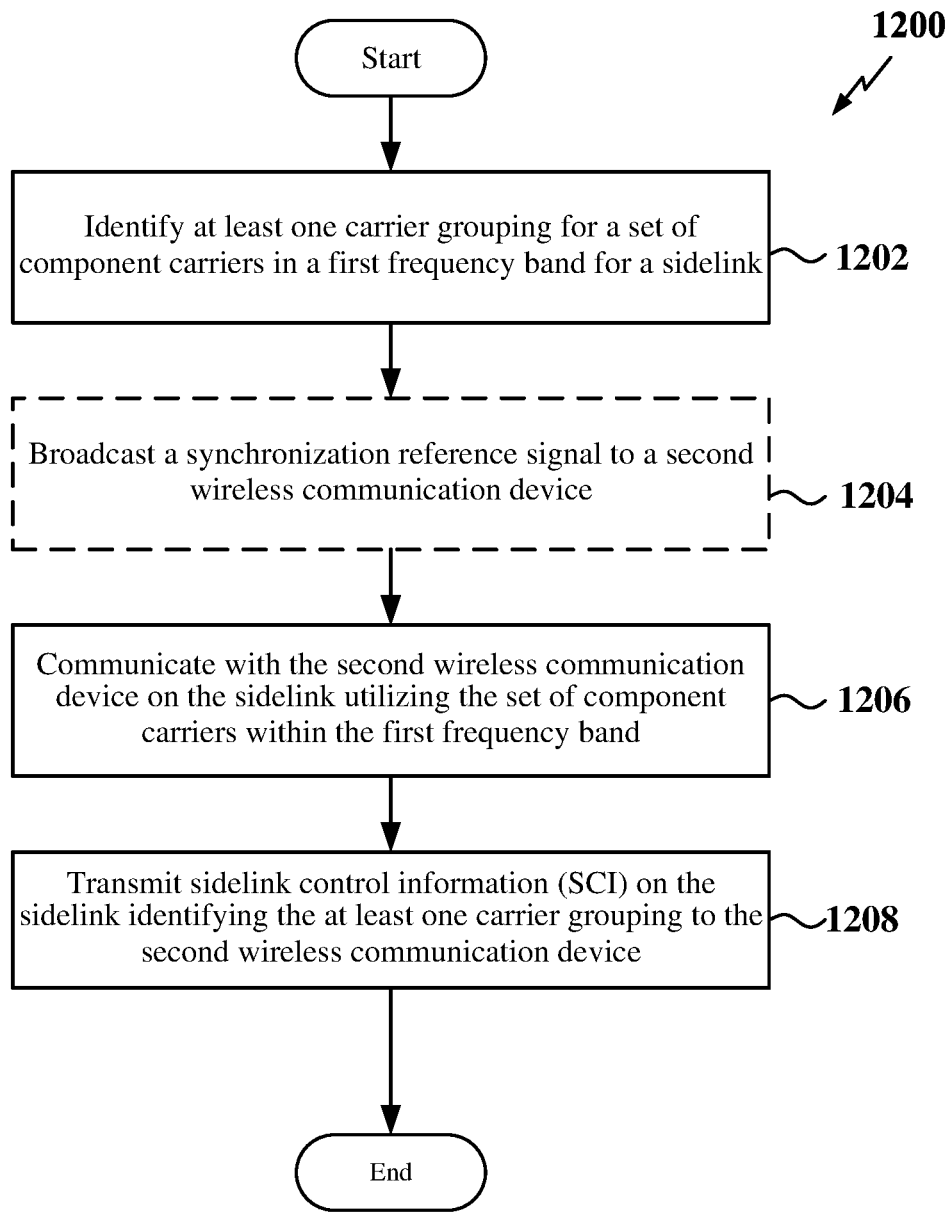
FIG. 12 is a flow chart of an example out of coverage sidelink carrier component grouping according to some aspects.

FIG. 12 is a flow chart illustrating an example method 1200 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1200 may be carried out by the UE 1000 illustrated in FIG. 10. In some examples, the method 1200 may be carried out by any suitable apparatus or means for carrying out the functions or algorithm described below.

At block 1202, a UE may identify at least one carrier grouping for a set of component carriers in a first frequency band for a sidelink. This operation may optionally be done by communicating with a BS or other scheduling entity on a cellular downlink. This operation may be performed well in advance of any sidelink communications. For out of coverage operations, this operation may be performed while the UE is still in a coverage area of a BS. In some examples, communication and processing circuitry 1041, in cooperation with the sidelink CC configuration circuitry 1042 shown and described above in connection with FIG. 10, may receive and identify the carrier groupings and store the information in the CC allocation and grouping information 1015 of the memory 1005. To receive CC and grouping information from a BS, for example, communication and processing circuitry 1041 together with the transceiver 1010, shown and described above in connection with FIG. 10, may cooperate with a transmitter or transceiver to establish and communicate over a Uu with the BS.

At block 1204, the UE may optionally be broadcasting a synchronization reference signal to a second wireless communication device. For example, communication and processing circuitry 1041 together with the transceiver 1010, shown and described above in connection with FIG. 10, may cooperate with a transmitter or transceiver (e.g., which may be the same as or different from the transmitter or transceiver referenced above at block 1202) to establish and communicate over the sidelink. Alternatively, the synchronization reference may be broadcast by a different UE.

At block 1206, the UE may communicate with the second wireless communication device on the sidelink utilizing the identified set of component carriers within the first frequency band. For example, communication and processing circuitry 1041 together with the transceiver 1010, shown and described above in connection with FIG. 10, may cooperate with a transmitter or transceiver to establish and communicate over the sidelink.

At block 1208, the UE may transmit sidelink control information (SCI) on the sidelink identifying the at least one carrier grouping to the second wireless communication device. For example, communication and processing circuitry 1041 together with the transceiver 1010, shown and described above in connection with FIG. 10, may cooperate with a transmitter or transceiver to establish and communicate over the sidelink and transmit information from the memory 1005. Alternatively, a different message format may be used to send the control information.

In some embodiments, the at least one carrier grouping comprises at least one of a timing advance group, a beamforming group, a dormancy group, a discontinuous reception group, a physical sidelink control channel group, and a multiple packet scheduling group. In some embodiments, communicating with the second wireless communication device further comprises aggregating at least two component carriers for utilization in communicating with the second wireless communication device. In some embodiments, the identifying comprises identifying a second carrier grouping for a second set of component carriers in a second frequency band for the sidelink and wherein the communicating with the second wireless communication device further comprises utilizing the second set of component carriers in the second frequency band.

Figure 13:
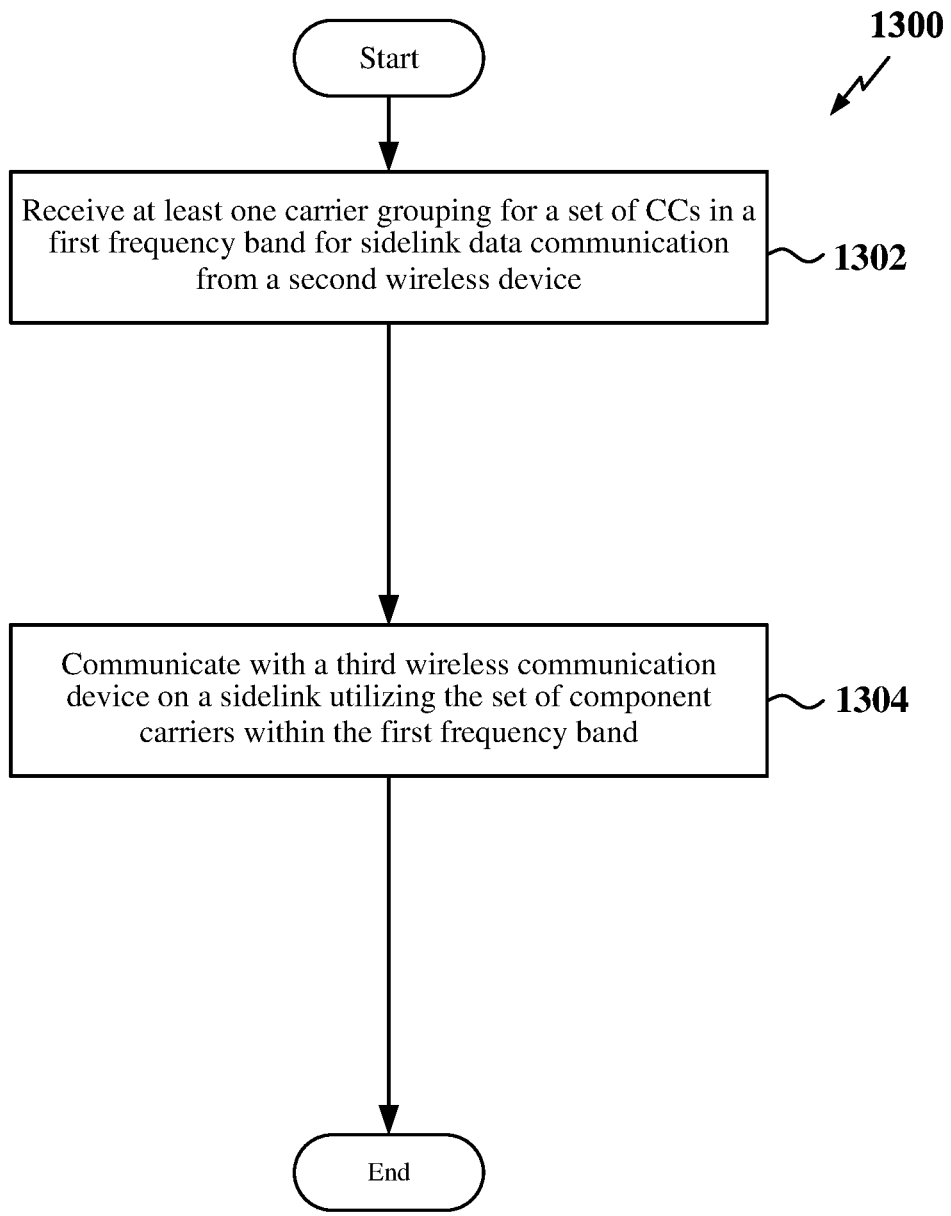
FIG. 13 is a flow chart of an example of transmitting between UEs over a sidelink according to some aspects.

FIG. 13 is a flow chart illustrating an example method 1300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1300 may be carried out by the UE 1000 illustrated in FIG. 10. In some examples, the method 1300 may be carried out by any suitable apparatus or means for carrying out the functions or algorithm described below.

At block 1302, a UE may receive at least one carrier grouping for a set of component carriers in a first frequency band for sidelink data communication from a second wireless communication device. This operation may optionally be done by communicating with a SynchRef UE in an out of coverage scenario or with another wireless communication device. In some examples, communication and processing circuitry 1041, in cooperation with the sidelink CC configuration circuitry 1042 shown and described above in connection with FIG. 10, may receive and identify the carrier groupings and store the information in the CC allocation and grouping information 1015 of the memory 1005. To receive CC and grouping information from a UE, for example, communication and processing circuitry 1041 together with the transceiver 1010, shown and described above in connection with FIG. 10, may cooperate with a transmitter or transceiver to receive over a SL or SL broadcast channel.

At block 1304, the UE may communicate with a third wireless communication device on a sidelink utilizing the set of component carriers within the first frequency band. For example, communication and processing circuitry 1041 together with the transceiver 1010, shown and described above in connection with FIG. 10, may cooperate with a transmitter or transceiver to establish and communicate over the sidelink.

In some embodiments, the receiving the at least one carrier grouping comprises receiving the at least one carrier grouping in sidelink control information (SCI) on the sidelink from the second wireless communication device. In some embodiments, communicating with the third wireless communication device further comprises aggregating at least two of the component carriers for utilization in communicating with the second wireless communication device.

The following provides an overview of examples of the present disclosure.

Example 1: A wireless communication device in a wireless communication network comprising: a transceiver; a memory; and a processor communicatively coupled to the transceiver and the memory, wherein the processor and the memory are configured to, at the wireless communication device: communicate with a base station on a cellular link utilizing a first set of first component carriers in a first frequency band; identify at least one first carrier grouping for the first set of first component carriers with the base station; communicate with a second wireless communication device on a sidelink utilizing a second set of second component carriers within the first frequency band; map at least one second component carrier to a respective corresponding first component carrier; and apply the at least one first carrier grouping to the second set of second component carriers to generate at least one second carrier grouping based on the mapping.

Example 2: The wireless communication device of example 1, wherein the identifying the at least one first carrier grouping comprises receiving a Radio Resource Control (RRC) configuration message from the base station.

Example 3: The wireless communication device of example 1 or 2, wherein the processor and the memory are further configured to: communicate with a base station on a cellular link utilizing a third set of third component carriers in a second frequency band; identify at least one third carrier grouping for the third set of third component carriers with the base station; communicate with the second wireless communication device on a sidelink utilizing a fourth set of fourth component carriers within the second frequency band; map at least one fourth component carrier to a respective corresponding third component carrier; and apply the at least one second carrier grouping to the fourth set of fourth component carriers to generate at least one fourth carrier grouping based on the mapping.

Example 4: The wireless communication device of example 3, wherein the first frequency band is higher than the second frequency band.

Example 5: The wireless communication device of any of examples 1 through 4, wherein the applying the at least one first carrier grouping comprises applying the at least one first carrier grouping to each component carrier of the second set of second component carriers.

Example 6: The wireless communication device of any of examples 1 through 5, wherein the second set of second component carriers are within a sidelink resource pool and wherein the applying the at least one first carrier grouping comprises applying the at least one first carrier grouping to each second component carrier of the second set of second component carriers that is within the sidelink resource pool.

Example 7: The wireless communication device of any of examples 1 through 6, wherein the at least one second carrier grouping comprises an additional carrier grouping including at least one of the second component carriers that does not map to a respective corresponding one of the first component carriers.

Example 8: The wireless communication device of any of examples 1 through 7, wherein the second set of second component carriers includes more component carriers than the first set of first component carriers.

Example 9: The wireless communication device of any of examples 1 through 8, wherein the mapping comprises mapping each second component carrier to a respective first component carrier and wherein the applying comprises applying each first carrier grouping of the at least one first carrier grouping to the respective mapped second component carrier.

Example 10: The wireless communication device of example 1, wherein the identifying comprises identifying the first carrier grouping including a third carrier grouping of a first type and a fourth carrier grouping of a second type for a first one of the first component carriers and wherein the applying comprises applying the third carrier grouping and the fourth carrier grouping to the corresponding mapped second component carrier.

Example 11: The wireless communication device of example 10, wherein the first type comprises at least one of a timing advance group, a beamforming group, a dormancy group, a discontinuous reception group, a physical uplink control channel group, and a multiple packet scheduling group and wherein the second type comprises another one of the timing advance group, the beamforming group, the dormancy group, the discontinuous reception group, the physical uplink control channel group, and multiple packet scheduling group.

Example 12: The wireless communication device of example 10 or 11, wherein the third carrier grouping includes a first subset of the first component carriers and the fourth carrier grouping includes a second subset of the first component carriers.

Example 13: The wireless communication device of any of examples 1 through 12, wherein the mapping the at least one second component carrier to the respective corresponding first component carrier further comprises mapping a plurality of second component carriers of the second set of second component carriers to a plurality of first component carriers of the first set of first component carriers based on a plurality of corresponding group types between respective carrier groupings of the plurality of first component carriers and the plurality of second component carriers.

Example 14: The wireless communication device of any of examples 1 through 13, wherein the processor and the memory are further configured to transmit sidelink control information (SCI) on the sidelink identifying the second carrier grouping from the first wireless communication device to the second wireless communication device.

Example 15: The wireless communication device of any of examples 1 through 14, wherein the communicating with the second wireless communication device further comprises communicating with a second wireless communication device by aggregating at least two of the second component carriers of the second set of second component carriers within the first frequency band.

Example 16: The wireless communication device of any of examples 1 through 15, wherein the at least one first carrier grouping comprises at least one of a timing advance group, a beamforming group, a dormancy group, a discontinuous reception group, a physical uplink control channel group, and multiple packet scheduling group.

Example 17: The wireless communication device of example 1, wherein the second set of second component carriers each utilize a same physical bandwidth and frequency as a corresponding one of the first set of first component carriers.

Example 18. The wireless communication device of any of examples 1 through 17, wherein the processor and the memory are further configured to receive the second set of second component carriers in an RRC configuration message from the base station.

Example 19: The wireless communication device of any of examples 1 through 18, wherein each first component carrier comprises a respective first bandwidth and each second component carrier comprises a respective second bandwidth, and wherein the mapping comprises mapping each second component carrier to a corresponding first component carrier for which the respective first bandwidth comprises the respective second bandwidth.

Example 20: A method for wireless communication at a first wireless communication device, the method comprising: communicating with a base station on a cellular link utilizing a first set of first component carriers in a first frequency band; identifying at least one first carrier grouping for the first set of first component carriers with the base station; communicating with a second wireless communication device on a sidelink utilizing a second set of second component carriers within the first frequency band; mapping at least one second component carrier to a respective corresponding first component carrier; and applying the at least one first carrier grouping to the second set of second component carriers to generate at least one second carrier grouping based on the mapping.

Example 21: The method of example 20, wherein the second set of second component carriers are within a sidelink resource pool and wherein the applying the at least one first carrier grouping comprises applying the at least one first carrier grouping to each second component carrier of the second set of second component carriers that is within the sidelink resource pool.

Example 22: The method of example 20 or 21, wherein the at least one second carrier grouping comprises an additional carrier grouping including at least one of the second component carriers that does not map to a respective corresponding one of the first component carriers.

Example 23: A wireless communication device in a wireless communication network comprising: a transceiver; a memory; and a processor communicatively coupled to the transceiver and the memory, wherein the processor and the memory are configured to, at the wireless communication device: identify at least one carrier grouping for a set of component carriers in a first frequency band for a sidelink; communicate with a second wireless communication device on the sidelink utilizing the set of component carriers within the first frequency band; and transmit sidelink control information (SCI) on the sidelink identifying the at least one carrier grouping to the second wireless communication device.

Example 24: The wireless communication device of example 23, wherein the communicating with the second wireless communication device comprises broadcasting a synchronization reference signal to the second wireless communication device.

Example 25: The wireless communication device of example 24, wherein the at least one carrier grouping comprises at least one of a timing advance group, a beamforming group, a dormancy group, a discontinuous reception group, a physical sidelink control channel group, and a multiple packet scheduling group.

Example 26: The wireless communication device of any of examples 23 through 25, wherein the communicating with the second wireless communication device further comprises aggregating at least two component carriers of the set of the component carriers for utilization in communicating with the second wireless communication device.

Example 27: The wireless communication device of any of examples 23 through 26, wherein the identifying comprises identifying a second carrier grouping for a second set of second component carriers in a second frequency band for the sidelink and wherein the communicating with the second wireless communication device further comprises utilizing the second set of second component carriers in the second frequency band.

Example 28: A wireless communication device in a wireless communication network comprising: a transceiver; a memory; and a processor communicatively coupled to the transceiver and the memory, wherein the processor and the memory are configured to, at the wireless communication device: receive at least one carrier grouping for a set of component carriers in a first frequency band for sidelink data communication from a second wireless communication device; and communicate with a third wireless communication device on a sidelink utilizing component carriers of the set of component carriers in the first frequency band.

Example 29: The wireless communication device of example 28, wherein the receiving the at least one carrier grouping comprises receiving the at least one carrier grouping in sidelink control information (SCI) on the sidelink from the second wireless communication device.

Example 30: The wireless communication device of example 28 or 29, wherein the communicating with the third wireless communication device further comprises aggregating at least two component carriers of the set of the component carriers for utilization in communicating with the second wireless communication device Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-3 and/or 5-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to a stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device in a wireless communication network comprising:
   a transceiver;
   a memory; and
   a processor communicatively coupled to the transceiver and the memory, wherein the processor and the memory are configured to, at the wireless communication device:
      communicate with a base station on a cellular link utilizing a first set of first component carriers in a first frequency band;
      identify at least one first carrier grouping of the cellular link for the first set of first component carriers with the base station;

communicate with a second wireless communication device on a sidelink utilizing a second set of second component carriers within the first frequency band;

map at least one second component carrier to a respective corresponding first component carrier; and apply the at least one first carrier grouping to the second set of second component carriers to generate at least one second carrier grouping of the sidelink based on the mapping.

2. The wireless communication device of claim 1, wherein the identifying the at least one first carrier grouping comprises receiving a Radio Resource Control (RRC) configuration message from the base station.

3. The wireless communication device of claim 1, wherein the processor and the memory are further configured to:

communicate with a base station on a cellular link utilizing a third set of third component carriers in a second frequency band;

identify at least one third carrier grouping for the third set of third component carriers with the base station;

communicate with the second wireless communication device on a sidelink utilizing a fourth set of fourth component carriers within the second frequency band;

map at least one fourth component carrier to a respective corresponding third component carrier; and apply the at least one second carrier grouping to the fourth set of fourth component carriers to generate at least one fourth carrier grouping based on the mapping.

4. The wireless communication device of claim 3, wherein the first frequency band is higher than the second frequency band.

5. The wireless communication device of claim 1, wherein the applying the at least one first carrier grouping comprises applying the at least one first carrier grouping to each component carrier of the second set of second component carriers.

6. The wireless communication device of claim 1, wherein the second set of second component carriers are within a sidelink resource pool and wherein the applying the at least one first carrier grouping comprises applying the at least one first carrier grouping to each second component carrier of the second set of second component carriers that is within the sidelink resource pool.

7. The wireless communication device of claim 1, wherein the at least one second carrier grouping comprises an additional carrier grouping including at least one of the second component carriers that does not map to a respective corresponding one of the first component carriers.

8. The wireless communication device of claim 1, wherein the second set of second component carriers includes more component carriers than the first set of first component carriers.

9. The wireless communication device of claim 1, wherein the mapping comprises mapping each second component carrier to a respective first component carrier and wherein the applying comprises applying each first carrier grouping of the at least one first carrier grouping to the respective mapped second component carrier.

10. The wireless communication device of claim 1, wherein the identifying comprises identifying the first carrier grouping including a third carrier grouping of a first type and a fourth carrier grouping of a second type for a first one of the first component carriers and wherein the applying comprises applying the third carrier grouping and the fourth carrier grouping to the corresponding mapped second component carrier.

11. The wireless communication device of claim 10, wherein the first type comprises at least one of a timing advance group, a beamforming group, a dormancy group, a discontinuous reception group, a physical uplink control channel group, and a multiple packet scheduling group and wherein the second type comprises another one of the timing advance group, the beamforming group, the dormancy group, the discontinuous reception group, the physical uplink control channel group, and multiple packet scheduling group.

12. The wireless communication device of claim 10, wherein the third carrier grouping includes a first subset of the first component carriers and the fourth carrier grouping includes a second subset of the first component carriers.

13. The wireless communication device of claim 1, wherein the mapping the at least one second component carrier to the respective corresponding first component carrier further comprises:

mapping a plurality of second component carriers of the second set of second component carriers to a plurality of first component carriers of the first set of first component carriers based on a plurality of corresponding group types between respective carrier groupings of the plurality of first component carriers and the plurality of second component carriers.

14. The wireless communication device of claim 1, wherein the processor and the memory are further configured to transmit sidelink control information (SCI) on the sidelink identifying the second carrier grouping from the first wireless communication device to the second wireless communication device.

15. The wireless communication device of claim 1, wherein the communicating with the second wireless communication device further comprises:

communicating with a second wireless communication device by aggregating at least two of the second component carriers of the second set of second component carriers within the first frequency band.

16. The wireless communication device of claim 1, wherein the at least one first carrier grouping comprises at least one of a timing advance group, a beamforming group, a dormancy group, a discontinuous reception group, a physical uplink control channel group, and multiple packet scheduling group.

17. The wireless communication device of claim 1, wherein the second set of second component carriers each utilize a same physical bandwidth and frequency as a corresponding one of the first set of first component carriers.

18. The wireless communication device of claim 1, wherein the processor and the memory are further configured to receive the second set of second component carriers in an RRC configuration message from the base station.

19. The wireless communication device of claim 1, wherein each first component carrier comprises a respective first bandwidth and each second component carrier comprises a respective second bandwidth, and wherein the mapping comprises mapping each second component carrier to a corresponding first component carrier for which the respective first bandwidth comprises the respective second bandwidth.

20. A method for wireless communication at a first wireless communication device, the method comprising:

communicating with a base station on a cellular link utilizing a first set of first component carriers in a first frequency band;

identifying at least one first carrier grouping of the cellular link for the first set of first component carriers with the base station;

communicating with a second wireless communication device on a sidelink utilizing a second set of second component carriers within the first frequency band;

mapping at least one second component carrier to a respective corresponding first component carrier; and applying the at least one first carrier grouping to the second set of second component carriers to generate at least one second carrier grouping of the sidelink based on the mapping.

21. The method of claim 20, wherein the second set of second component carriers are within a sidelink resource pool and wherein the applying the at least one first carrier grouping comprises applying the at least one first carrier grouping to each second component carrier of the second set of second component carriers that is within the sidelink resource pool.

22. The method of claim 20, wherein the at least one second carrier grouping comprises an additional carrier grouping including at least one of the second component carriers that does not map to a respective corresponding one of the first component carriers.

23. A wireless communication device in a wireless communication network comprising:

a transceiver;

a memory; and a processor communicatively coupled to the transceiver and the memory, wherein the processor and the memory are configured to, at the wireless communication device:

identify at least one carrier grouping for a set of component carriers in a first frequency band for a sidelink;

communicate with a second wireless communication device on the sidelink utilizing the set of component carriers within the first frequency band; and transmit sidelink control information (SCI) on the sidelink identifying the at least one carrier grouping to the second wireless communication device.

24. The wireless communication device of claim 23, wherein the communicating with the second wireless communication device comprises broadcasting a synchronization reference signal to the second wireless communication device.

25. The wireless communication device of claim 24, wherein the at least one carrier grouping comprises at least one of a timing advance group, a beamforming group, a dormancy group, a discontinuous reception group, a physical sidelink control channel group, and a multiple packet scheduling group.

26. The wireless communication device of claim 23, wherein the communicating with the second wireless communication device further comprises:

aggregating at least two component carriers of the set of the component carriers for utilization in communicating with the second wireless communication device.

27. The wireless communication device of claim 23, wherein the identifying comprises identifying a second carrier grouping for a second set of second component carriers in a second frequency band for the sidelink and wherein the communicating with the second wireless communication device further comprises utilizing the second set of second component carriers in the second frequency band.

28. A wireless communication device in a wireless communication network comprising:

a transceiver;

a memory; and a processor communicatively coupled to the transceiver and the memory, wherein the processor and the memory are configured to, at the wireless communication device:

receive at least one carrier grouping for a set of component carriers in a first frequency band for sidelink data communication from a second wireless communication device; and communicate with a third wireless communication device on a sidelink utilizing component carriers of the set of component carriers in the first frequency band.

29. The wireless communication device of claim 28, wherein the receiving the at least one carrier grouping comprises receiving the at least one carrier grouping in sidelink control information (SCI) on the sidelink from the second wireless communication device.

30. The wireless communication device of claim 28, wherein the communicating with the third wireless communication device further comprises:

aggregating at least two component carriers of the set of the component carriers for utilization in communicating with the second wireless communication device.

* * * * *